(12) United States Patent
Smith

(10) Patent No.: US 7,043,667 B2
(45) Date of Patent: May 9, 2006

(54) DEBUG INFORMATION PROVIDED THROUGH TAG SPACE

(75) Inventor: Michael D. Smith, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 557 days.

(21) Appl. No.: 10/146,002

(22) Filed: May 14, 2002

(65) Prior Publication Data

US 2003/0217311 A1    Nov. 20, 2003

(51) Int. Cl.
*G06F 11/00* (2006.01)

(52) U.S. Cl. .................................................. 714/43
(58) Field of Classification Search ................ 714/43
See application file for complete search history.

(56) References Cited

U.S. PATENT DOCUMENTS

| | | | |
|---|---|---|---|
| 5,832,238 A | 11/1998 | Helms | |
| 5,983,024 A | 11/1999 | Fye | |
| 6,009,488 A | 12/1999 | Kavipurapu | |
| 6,018,810 A * | 1/2000 | Olarig | 714/43 |
| 6,145,039 A | 11/2000 | Ajanovic et al. | |
| 6,298,424 B1 | 10/2001 | Lewchuk et al. | |
| 6,438,128 B1 * | 8/2002 | Kashyap | 370/389 |
| 6,496,792 B1 * | 12/2002 | Magnusson | 703/27 |
| 6,523,140 B1 * | 2/2003 | Arndt et al. | 714/44 |
| 2002/0120805 A1 | 8/2002 | Hensley et al. | |
| 2003/0046356 A1 * | 3/2003 | Alvarez et al. | 709/208 |
| 2003/0065842 A1 | 4/2003 | Riley et al. | |

OTHER PUBLICATIONS

Declaration of Michael D. Smith.

* cited by examiner

Primary Examiner—Robert Beausoliel
Assistant Examiner—Michael Maskulinski
(74) Attorney, Agent, or Firm—Alan K. Aldous

(57) ABSTRACT

In some embodiments, the invention includes a device and bus transaction control circuitry to provide bus transactions with tag space, wherein under some conditions at least part of the tag space is used to provide debug information and under some conditions at least part of the tag space is used to represent a transaction number. Other embodiments are described and claimed.

33 Claims, 6 Drawing Sheets

DEBUG INFORMATION PROVIDED THROUGH TAG SPACE

BACKGROUND OF THE INVENTION

1. Technical Field of the Invention

The present invention relates to computer systems and, more particularly, to a computer system in which debug information is provided through tag space in a bus transaction.

2. Background Art

Chips in computer systems are becoming increasingly complex. In some cases, validation of the chips in systems in which they are placed takes close to as much time as the original designing of the chips. An important aspect of validation is the observability of internal states. This is often difficult to do because there are a limited number of pins/pads from which to observe internal signals.

A number of bus specifications have been introduced. Versions of the Peripheral Component Interconnect (PCI) Local Bus Specification have been widely used. A PCI Local Bus Specification rev. 2.2 is dated Dec. 18, 1998 by the PCI Special Interest Group (SIG).

More recently, a PCI-X Addendum to the PCI Local Bus Specification rev. 1.0 and 1.0a has been introduced by the PCI SIG. Rev. 1.0a of the PCI-X specification is dated Jul. 24, 2000. Descriptions of the PCI and PCI-X specifications are widely available. For example, T. Shanley, PCI-X System Architecture (MindShare, Inc. 2001) describes the PCI-X specification rev. 1.0.

In the PCI-X specification, a requester makes a transaction request that is completed by a transaction completer. The completer may be on the same or a different bus than the requester. When the requester and completer are on different buses, the buses may be joined through one or more bridges or hubs. When the requester and completer are on the same bus, the completer is the target. When the requester and completer are on different buses joined through a bridge, the bridge is the target.

The target (the completer or bridge) may complete a requested transaction immediately or by means of the PCI-X split transaction protocol. In the split transaction protocol, the target provides a split response to the requester and the target and requester may then proceed to other business. At a later time, the target returns the transaction results in a series of one or more split completion transactions. A sequence is a series of one or more transactions performed to accomplish one overall transfer originally initiated by a requester, such as for example a split request transaction and its corresponding split completion transaction(s). Each transaction associated with a specific sequence uses the same sequence identification (ID), which includes a requester identification (ID) and a tag. The requester ID identifies the requester by providing its bus number, device number, and function number in the transaction's attribute phase. The tag is a 5-bit number that identifies the transaction number from that requester.

In the PCI-X specification, the request includes four phases: address phase, attribute phase, response phase, and data phase(s). A 5-bit tag field is included in bits AD[24]–AD [28] of the attribute phase of the request. The split completion includes four phases: address phase, attribute phase, response phase, and data phase(s). In the split completion address phase, the sequence ID is provided by the completer as an address to identify the original requester. The tag is included in bits AD[24]–AD [28] during the split completion transaction address phase. In the completion attribute phase, bits AD[24]–AD [28] are reserved. A completer ID includes the completer's bus, device, and function numbers and is also provided in the attribute phase. The completer ID is provided for use by testing tools, such as the Agilent Technology PCI bus exerciser.

A PCI Express specification, formerly known as 3GIO ($3^{rd}$ generation input output), is in the process of being defined by the PCI SIG. The PCI Express specification defines the PCI Express bus, signals on the bus, and some details of chips being connected by PCI Express buses. Drafts of the PCI Express specification have been circulated to many companies in the computer industry. The PCI Express specification has some similarities to the PCI and PCI-X specifications, but also many enhancements. For purposes of the present disclosure, it is sufficient to note that the PCI Express specification includes a transaction descriptor for carrying transaction information between a transaction requester and a transaction completer. In some proposed implementations of PCI Express, a tag field is in byte 6 of the request header.

The transaction descriptor contains various fields including a transaction ID which identifies the requester (through bus number, device number, and function number) and a tag which identifies a transaction number from that requester. Different details for the transaction ID field have been proposed. Under different proposals, the tag includes 5 or 8 bits. As can be noticed, the transaction ID field of the PCI Express specification has similarities to the sequence ID of the PCI-X specification. In some implementations, the function number in PCI Express may be a phantom function number. In such a case, some encodings of the 3-bit function number may be used to increase the number of possible transaction numbers. That is, unclaimed function numbers may be used as phantom function numbers that may be used in conjunction with tag bits to increase the number of possible transaction numbers.

It has been proposed that buses using the PCI Express specification be used to join a variety of chips in a computer system including between the north bridge (also called the host bridge, north hub, and memory controller hub) and the south bridge (also called the input/output (I/O) bridge, and I/O controller hub); between the north bridge and a graphics chip (e.g., for what is called the advanced graphics port (AGP)); between the north bridge and additional bridges or switches; between the south bridge and additional bridges or switches; and between additional bridges and switches and chips to which they are connected. There may be multiple bridges and switches cascaded together with PCI Express buses or other buses such as PCI-X buses.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

The present invention relates to computer systems in which some chips are capable of providing debug information in tag space of bus transactions. Possible examples of tag space are tag bits in a tag field, phantom function number extensions for tag purposes, or other extensions of the tag space. In some embodiments, the tag space may be restricted to merely a tag field and not include additional space such as encodings provided by phantom function numbers or other extensions. In other embodiments, the tag space may also include one or more additional extensions such as phantom function number extensions. Under some conditions at least part of the tag space is used to provide debug information and under some conditions at least part of the tag space is used to represent a transaction number. In the preceding sentence, the different references to "some conditions" may be referring to different conditions or in some cases, the same conditions.

Figure 1:
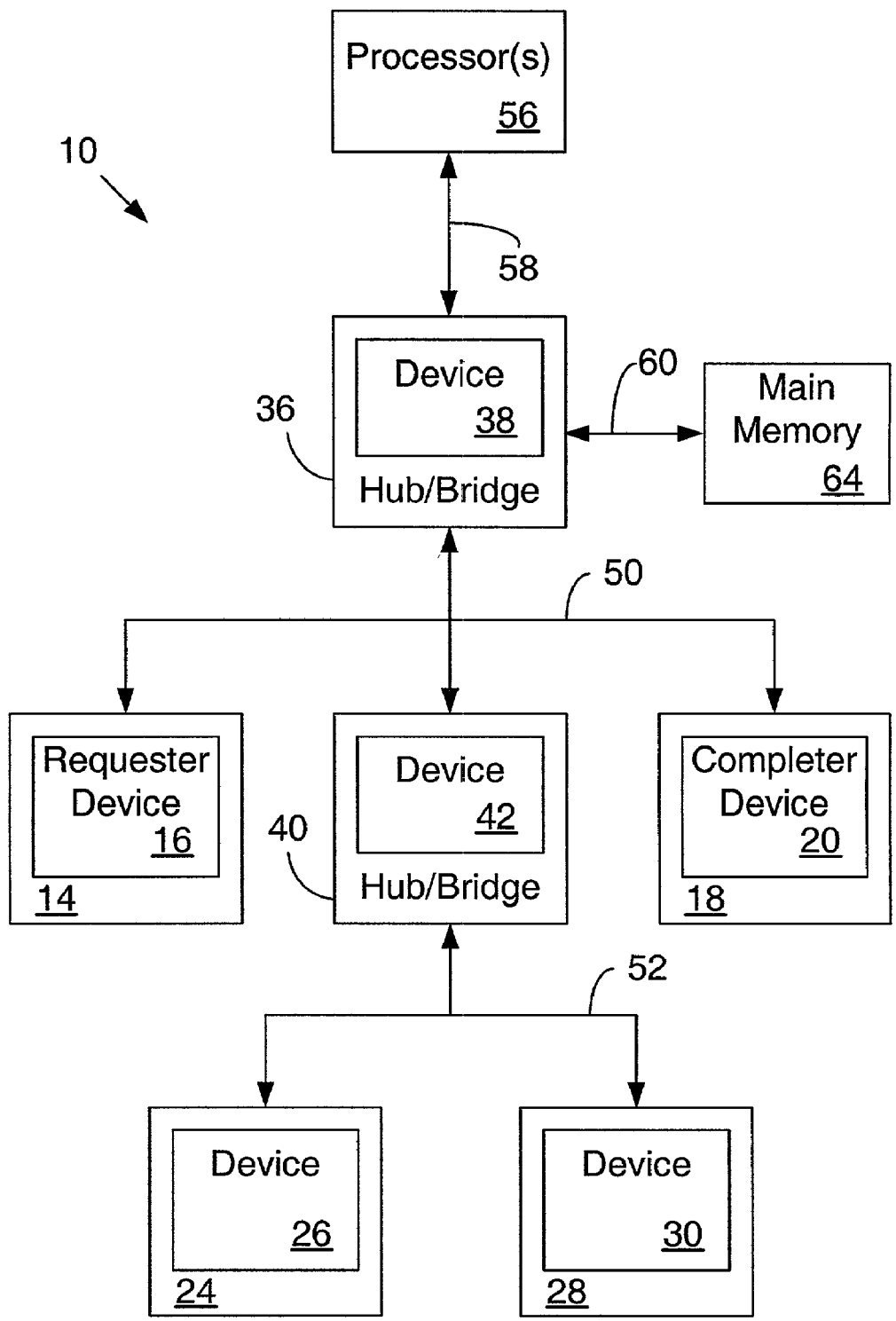
FIG. 1 is a block diagram representation of a system according to some embodiments of the invention.

There are a variety of systems in which embodiments of the present invention may be implemented. FIG. 1 illustrates a system 10 that includes chips 14, 18, 24, 28, 36, and 40, which each include one or more devices. Chips 14, 18, 36, and 40 are on a bus 50. Chips 24, 28, and 40 are on a bus 52. Chips 14, 18, 24, 28, 36, and 40 may be coupled to additional chips that are not illustrated in FIGS. 1 and 2, although in some cases the coupling may be wireless. Other chips in system 10 include processor(s) 56 and main memory 64. Chips 36 and 40 are hubs or bridges. The terms hub and bridge are often used synonymously, but are sometimes used to mean somewhat different things. The invention is not restricted to a particular meaning for the terms hub and bridge. Hub 36 is also coupled through a bus 58 to processor(s) 56 and a bus 60 to main memory 64. In some systems, bus 58 is referred to as a front-side bus (FSB), but the invention is not limited to these systems. Indeed, system 10 is provided for explaining some aspects of the invention. However, the invention may be practiced in systems without some of the chips of system 10 and it may be included in systems with additional chips. For example, main memory 64 may be directly coupled to processor(s) 56 rather than through hub 36. As another example, the invention may be used in communication or network systems without all the chips of system 10.

The invention is not restricted to a particular type of bus or bus transaction, except that the bus transactions include a tag field as mentioned. Buses 50 and 52 may be unidirectional, bi-directional, simultaneous bi-directional, source synchronous, point-to-point, multidrop and/or other types of buses. Two voltage (low and high) signaling or multi-voltage (3 or more voltages) signaling may be used. Non-electrical signaling (such as optical signaling) may also be used. The address, data, and control signals may be kept separate or multiplexed or otherwise embedded such as through a packetized scheme. The invention may be used in connection with a PCI Express standard, PCI-X standard, or other standard or non-standard bus protocol.

In some signaling techniques, bits are somewhat of an abstraction. For example, in multi-voltage schemes, such as are used in simultaneous bi-directional signaling, bits are represented at different voltage levels. In some signaling techniques, such as in packetized signals, bits might be represented through encodings. Accordingly, as used herein, the term bits is not intended to be restricted to a particular form on the buses. The bits may be transformed from the time they are set to the time they are detected on a bus. A bus transaction request and completion may have more than one phase and include portions separated by time.

Some chips in a system employing the invention are capable of providing debug information through tag space of bus transactions, while other chips in a system might not have such a capability. In the example, of FIG. 1, chips 14, 18, 24, 28, 36, and 40 are capable chips and each include one or more capable devices. There may be additional capable chips in the system and there may also be chips in the system that are not capable. In the example discussed, processor(s) 56 and main memory 64 are not capable chips, but they may be capable chips in other embodiments.

In FIG. 1, device 16 makes a request of device 20. Accordingly, in this example, device 16 is the requester and device 20 is the completer. According to some protocols, completer device 20 is the target of the transaction. When requester device 16 makes a transaction request of device 20 it provides tag bits with the request that indicate the transaction number of the request. In PCI-X revision 1.0, there are 5 tag bits (in bits AD[24]–AD[28] of the attribute phase of the request). In some proposed implementations of PCI Express, the tag field is in byte 6 of the request header. Having 5 tag bits allows up to 32 outstanding transactions. Some transactions do not require a completion and the tag field may go completely unused for transaction purposes and all of the tag field is available for other purposes, such as providing debug information. For example, memory writes may not require a completion and messages (e.g., message 0) may not require a completion.

Figure 3:
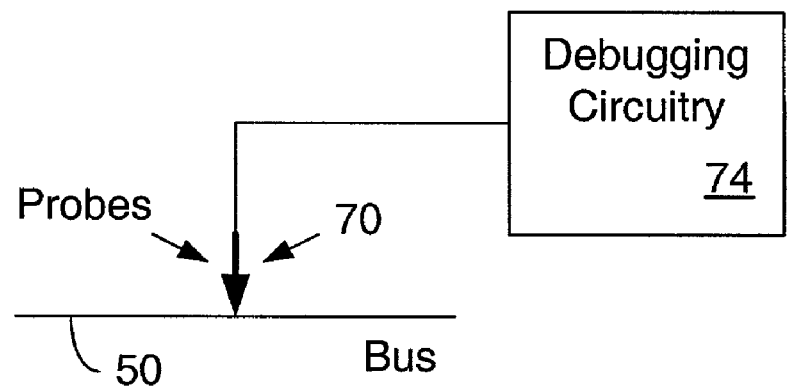
FIG. 3 is a schematic block diagram representation of probes applied to a bus of FIG. 1 according to some embodiments of the invention.

Even in the case of transactions that do require completions, the requester might not need all the bits of the tag field. For example, assume that requester device 16 cannot have more than 8 outstanding transactions at a time, and bus 50 is a PCI-X bus. Accordingly, only 3 bits would be needed to keep track of the transaction number. If such were the case, 2 bits would be available for requester device 16 to provide information about, for example, itself. If the information were debug information, it could be accessed by probes applied to bus 50. For example, FIG. 3 illustrates probes 70 being applied to bus 50 of system 10. Debugging circuitry 74 receives signals from probes 70 including, for example, bits AD[27] and [28] during the attribute phase of the request. In another example, only 2 tag bits may be needed and 3 go unused for transaction purposes and are available for other purposes such as debug, or 4 tag bits are used and 1 is available for other purposes.

The following are two approaches to determine whether a bit may be available for providing debug information. Under a first approach, if a bit is used as part of a transaction number for any of the possible transaction numbers, then it is not available for providing debug information. Under a second approach, as long as a bit is not currently needed as part of a transaction number, the bit may be available for providing debug information. These approaches can be illustrated through the following example in which there are 5 bits (bits B0, B1, B2, B3, and B4) in the tag field and there may be only five outstanding transactions at a time. The 32 possible encodings of bits B0–B4 can be represented in the following table in which X represents a "don't care."

| B4 | B3 | B2 | B1 | B0 |
|----|----|----|----|----|
| X  | X  | 0  | 0  | 0  |
| X  | X  | X  | 0  | 1  |
| X  | X  | X  | 1  | 0  |
| X  | X  | X  | 1  | 1  |
| X  | X  | 1  | 0  | 0  |

Under the first approach, bit B2 would not be available to provide debug information under any encodings. Under the second approach, bit B2 would be available to provide debug information as long as B1 and B0 are not 00, respectively. Again, it is noted that the bits might be transformed into multi-level signals such that the 0's and 1's are somewhat an abstraction at the time the tag field is on the bus.

Figure 2:
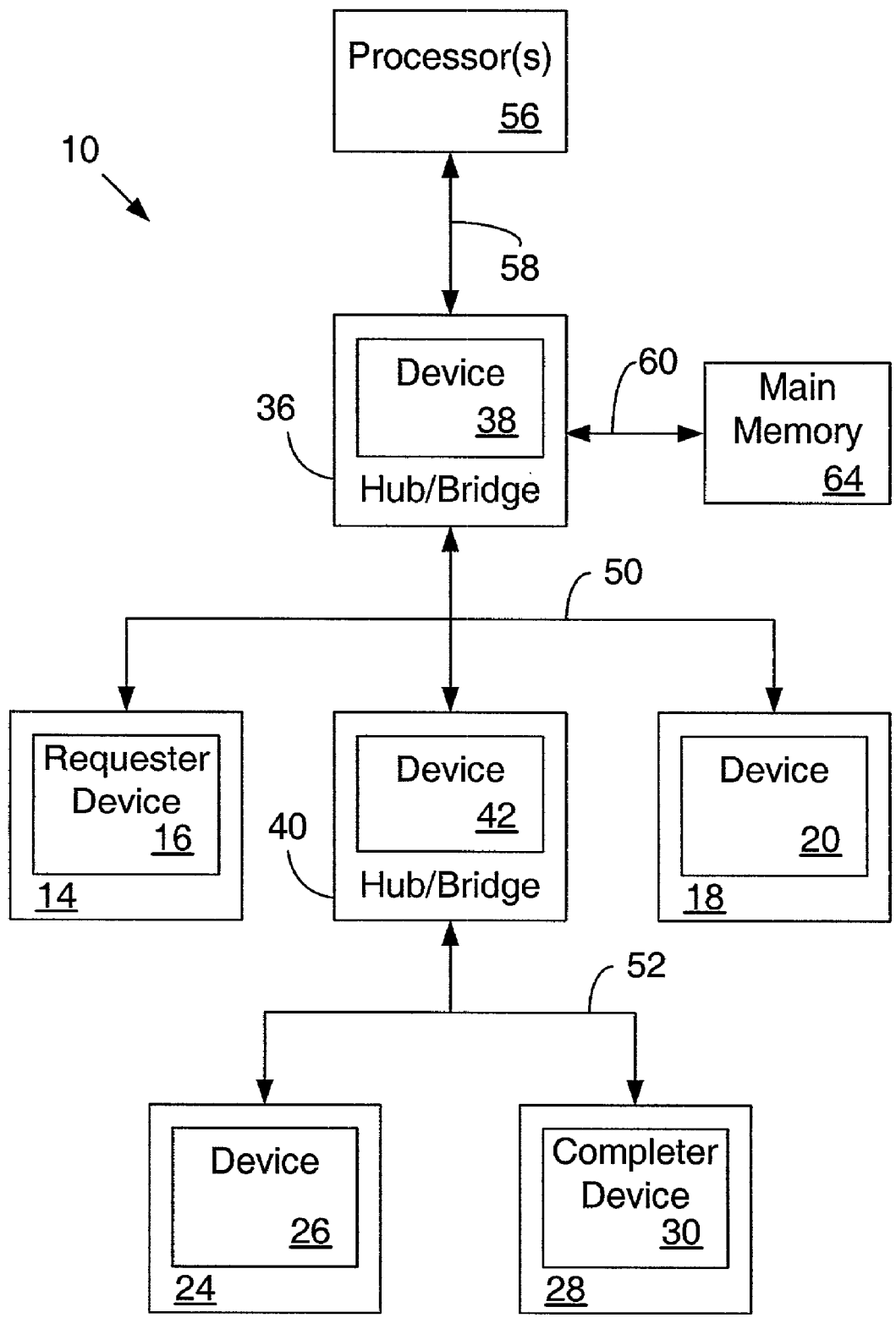
FIG. 2 is a block diagram representation of a system according to some embodiments of the invention.

In FIG. 2, the requester device is still device 16, but the completer device is device 30. In this case, requester and completer are on different buses and are separated by hub 40. Information can be provided in the tag field by chip 14. Hub 40 can repeat the tag field as it passes the request to completer device 30 or hub 40 can change the tag field before it is passed to completer device 30. If hub 40 changes the tag field, then it may also change the requester ID to be that of a device in hub 40. However, under the PCI-X and PCI Express standards, the tag returned by hub 40 to chip 14 is the same as the original tag field provided by chip 14 to hub 40. Chip 14 is referred to as an original requesting chip and device 16 is referred to as an original requesting device. Hub 40 is referred to as an intermediate requesting chip and device 42 is referred to as an intermediate requesting device. The physical location in which the tag bits are set to provide debug information may be in the device or in a portion of the chip other than the device.

Figure 4:
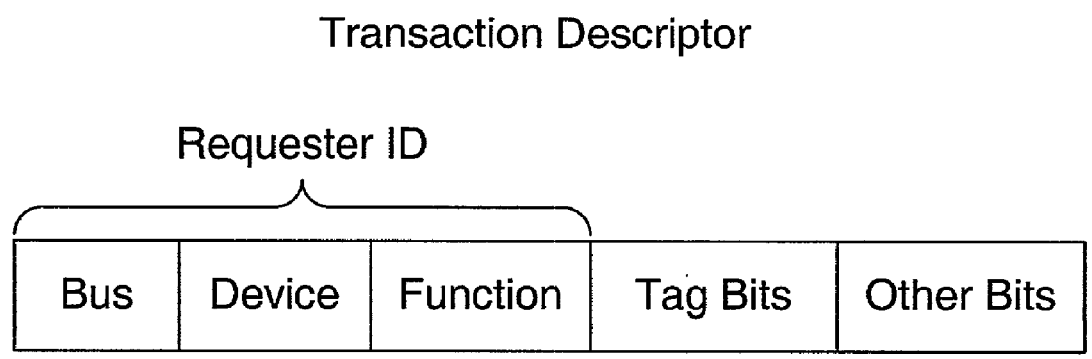
FIG. 4 is a schematic representation of a transaction descriptor which may be used in some embodiments of the invention.

FIG. 4 illustrates a transaction descriptor for a proposed PCI Express protocol. The PCI-X request transaction includes the same fields. The bus number, device number, and function number fields are included in the requester ID. Depending on the implementation, the tag field may include from 5 to 8 bits. Of course, the invention is not restricted to a particular number of tag bits. More than 8 or fewer than 5 tag bits could be used. As mentioned, in some implementations, unclaimed function numbers may be used as phantom function numbers. In this case, some function numbers may be used in conjunction with tag bits to increase the space of possible transaction numbers. When not otherwise used, this excess tag space can be used by the requester to provide information such as for debug purposes.

Figure 5:
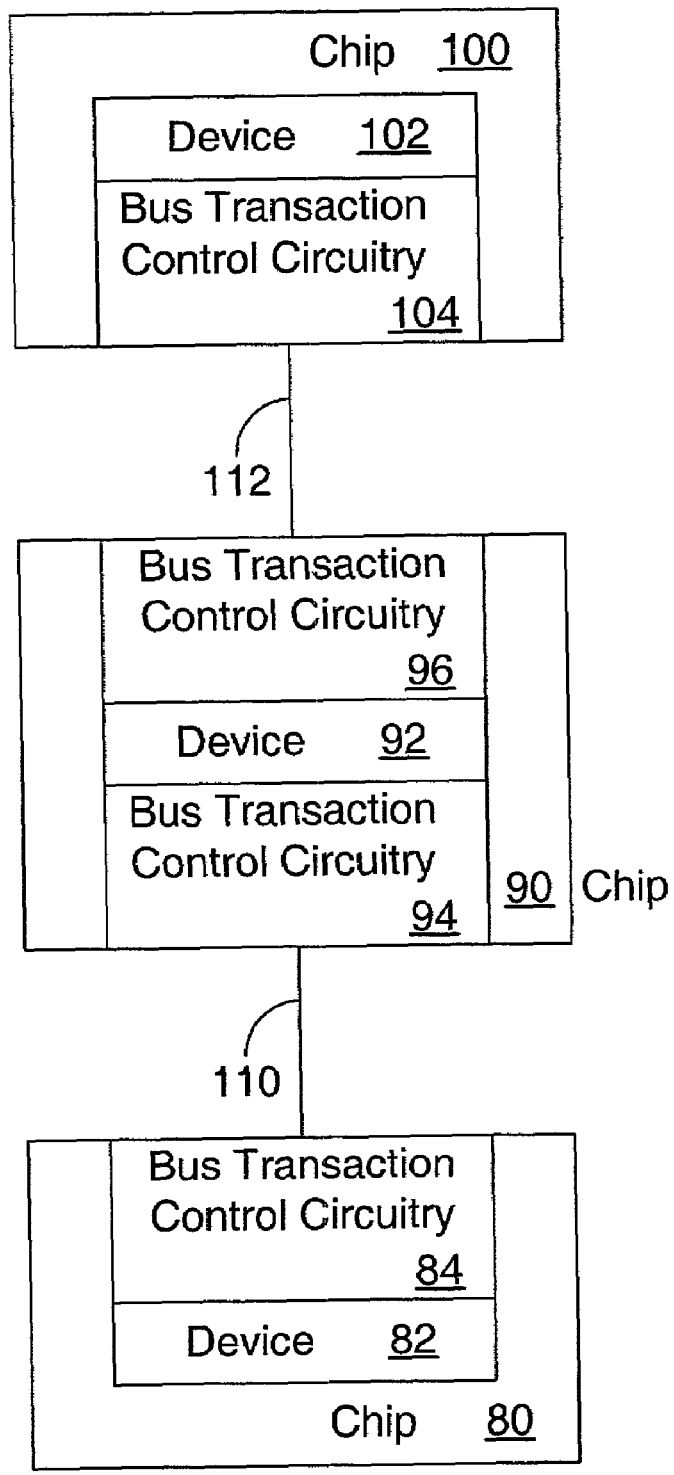
FIG. 5 is a block diagram representation of a system according to some embodiments of the invention.

FIG. 5 illustrates three chips 80, 90, and t00. Chips 80, 90, and 100 include devices 82, 92, and 102, respectively, and may include additional devices. Chips 80 and 90 are connected by bus 110 and chips 90 and 100 are connected through bus 112, which may be any of a variety of types of buses. Chips 80, 90, and 100 also include bus transaction control circuitry 84, 94, 96, and 104 to provide and receive the bus transactions with tag fields. Bus transaction control circuitry 94 and 96 may be the same circuitry or different circuitry.

As an example for FIG. 5, assume chip 80 makes a transaction request that is ultimately to be handled by device 102 of chip 100, but which is passed through chip 90 to chip 100. Bus transaction control circuitry 84 provides a bus transaction on bus 110 to bus transaction control circuitry 94 of chip 90. Chip 90 then passes the request on to chip 100 through a bus transaction on bus 112 from bus transaction control circuitry 96 to bus transaction control circuitry 104. A completion, if called for by the protocol, may be issued from chip 100 through a bus transaction over bus 112 to chip 90 and another completion from chip 90 through a bus transaction on bus 110 to chip 80. Chip 80 may set certain bits of the tag field in the bus transaction sent to chip 90. Chip 90 may pass on the same tag field or alter the tag field (along with the requester ID) it sends to chip 100.

Figure 6:
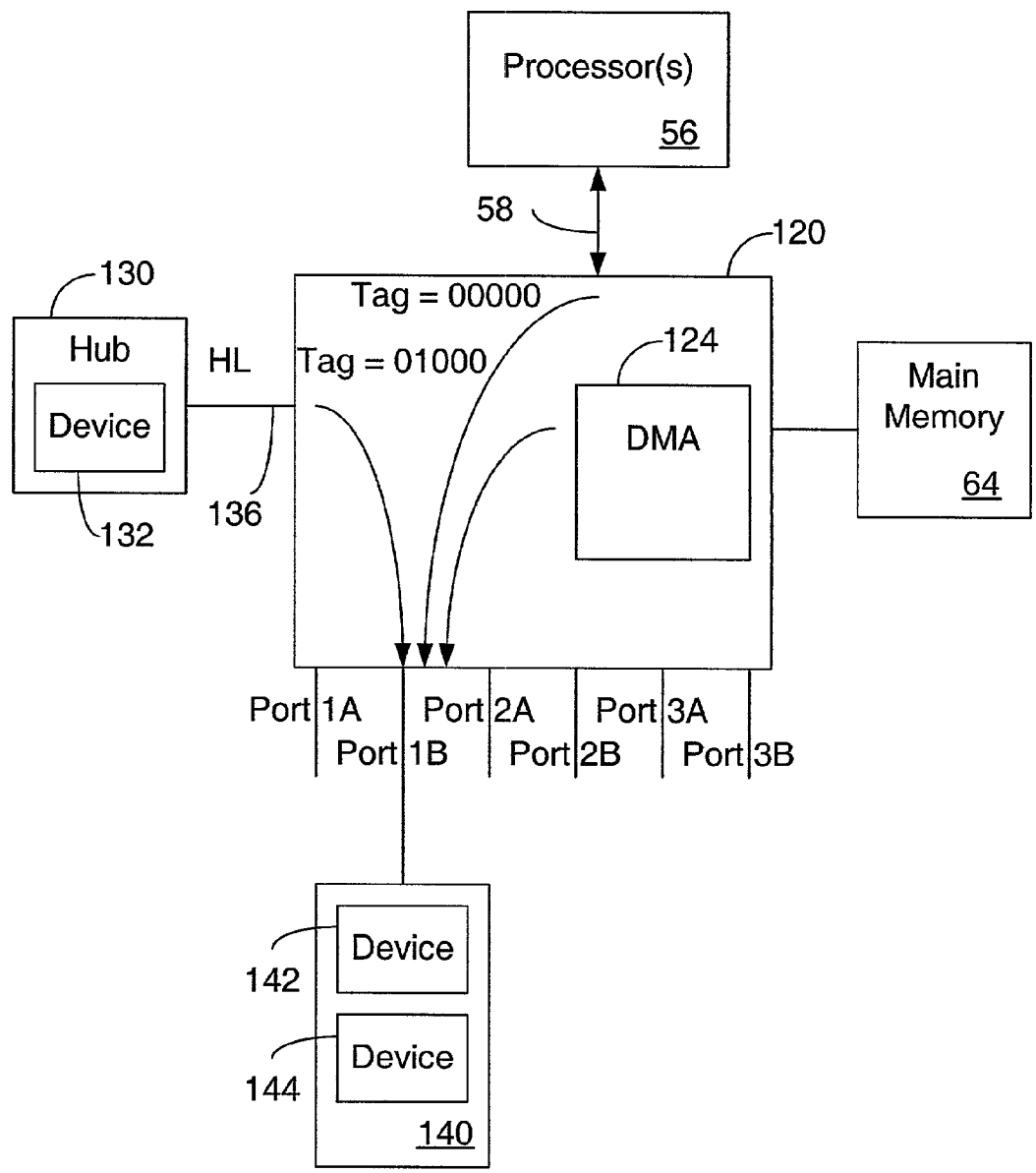
FIG. 6 is a block diagram representation of a system according to some embodiments of the invention.

FIG. 6 illustrates a hub 120 which may be an example of hub 36 in FIG. 1. A hub link (HL) bus 136 couples hub 120 to another hub 130 including a device 132. Direct memory access (DMA) circuitry 124 in this example has four channels. Hub 120 includes multiple ports that carry bus transactions with tag fields (e.g., six ports 1A, 1B, 2A, 2B, 3A, and 3B). There may be fewer or more ports from hub 120. As an example, the bus transactions with tag fields may be PCI Express transactions, although they could be according to another protocol such as PCI-X. Port 1B is coupled to a chip 140 which includes devices 142 and 144. In this example, bus 58 is a front-side bus (FSB).

Assume that hub 120 is capable of supporting no more than 1 outstanding transaction per port, and that each transaction includes a 5-bit tag field. In this case, all 5 bit tag bits are available for providing debug information, such as the source or point of origin of each transaction issued by hub 120 on ports 1A . . . 3B. The following table lists one possible scheme for encoding this information. Other schemes may be used.

| Transaction Source | Tag field encodings |
|---|---|
| FSB (Front side bus) | 00000 |
| HL (Hub link) | 01000 |
| DMA channel 1 | 00001 |
| DMA channel 2 | 00010 |
| DMA channel 3 | 00011 |
| DMA channel 4 | 00100 |
| port 1A | 01010 |
| port 1B | 01011 |
| port 2A | 01100 |
| port 2B | 01101 |
| port 3A | 01110 |
| port 3B | 01111 |

Alternatively, some or all these tag bits could be used to provide other information, such as regarding other events, states, status, etc. discussed in this disclosure.

Figure 7:
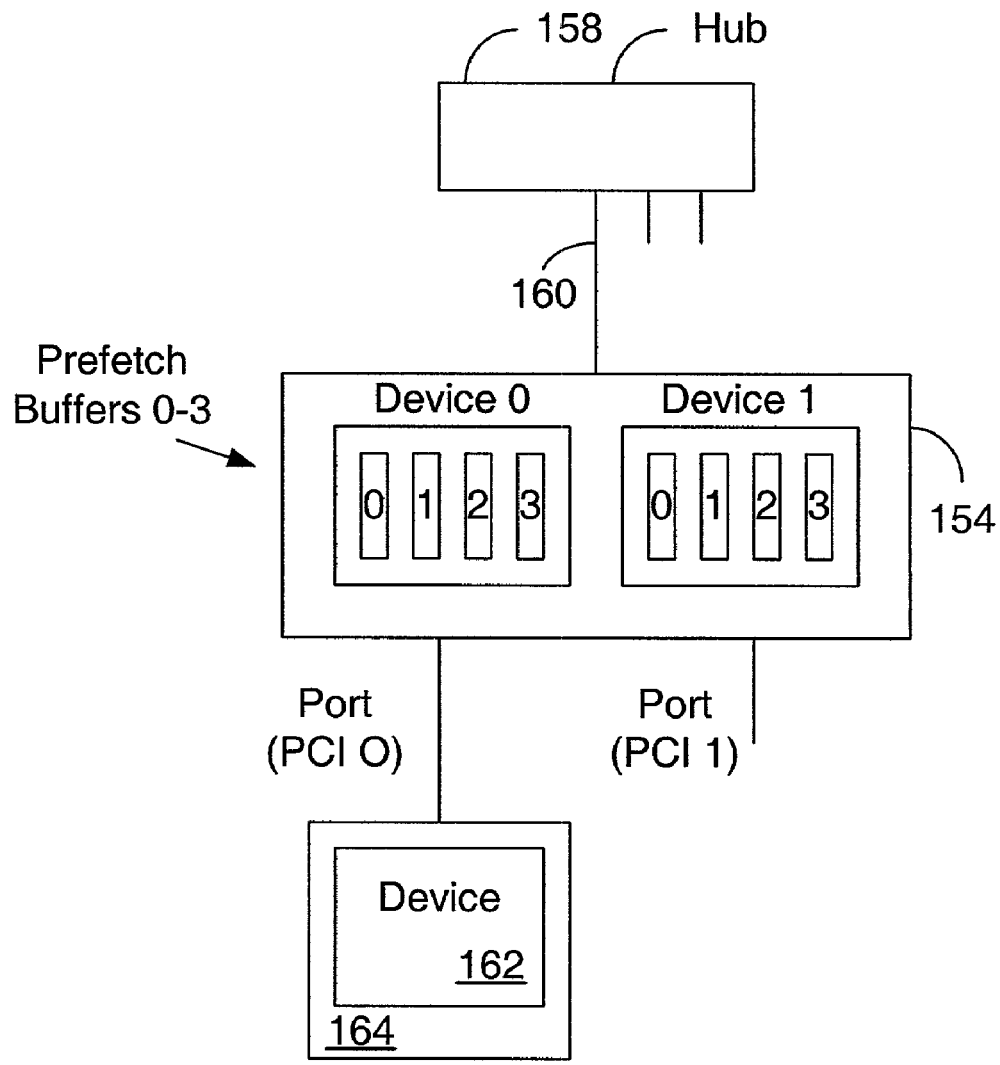
FIG. 7 is a block diagram representation of a system according to some embodiments of the invention.

FIG. 7 illustrates a hub or bridge 154 including two devices (device 0 and device 1), which are capable of doing prefetches on reads. Hub 154 communicates with hub 158 through a bus 160 whose protocol includes a 5-bit tag field and a requester ID field of which PCI-X is an example. A chip 164 includes one or more devices including device 162. Note that ports PCI 0 and PCI 1 to hub 154 are for PCI transactions that do not have tag space for transaction numbers, but the bus transaction on bus 160 provides transactions (e.g., PCI-X or PCI Express transactions) that do include tag space in which debug information may be provided.

In FIG. 7, assume device 162 makes a memory request of another device through hub 154 and perhaps also hub 158. Further assume device 0 can hold no more than four outstanding inbound read transactions, where inbound read transactions are those made toward hub 158. Each outstanding read transactions is held in one of the four prefetch buffers 0, 1, 2, and 3. Therefore, only 2 tag bits are needed to keep track of the outstanding transactions. Others of the tag bits may be used to indicate other information. Merely as examples, 2 of the tag bits could be used to indicate a point of origination within hub 154 (e.g., whether prefetch buffer 0, 1, 2, or 3 is used) and another bit may be used to encode the state of the prefetch buffer used at the time the transaction was issued with respect to whether the transaction was a prefetch cycle or non-prefetch cycle. If there were additional tag bits or other bits available, they could be used to indicate other information.

Another example with FIG. 7 is where device 0 of hub 154 allows, for example, 16 outstanding inbound read transactions, but each prefetch buffer (in device 0 of hub 154) is limited to 4 outstanding inbound read transactions. In this case, the tag space can be partitioned to indicate the originating prefetch buffer of each read.

In FIG. 7, the providing of debug information in tag fields allows debugging circuitry to easily distinguish (1) prefetch from non-prefetch transactions and (2) traffic from different buffers. There are many ways in which this may be useful. For example: item (1) may simplify and/or improve validation of inbound ordering by allowing prefetches, which can follow different ordering rules, to be masked out. Items (1) and (2) in conjunction may make it possible to explicitly validate that prefetches happen when they should, and that buffers are invalidated at appropriate times. Items (1) and (2) in conjunction may also provide visibility into the operation of a single buffer during complicated tests. This may provide for easier debug and isolation of problems post silicon.

Some or all of the tag space may provide information about a variety of things of which the following are some examples:

1. Tag space may be used to provide information about an original requesting chip or device (e.g., chip 14 or requester device 16) or an intermediate requesting chip or device (e.g., chip 40 or hub 42). Other examples are provided above.

2. Tag space may be used to identify an external point of origin, for example, a port through which a request passes. For example, FIG. 6 illustrates multiple ports in hub 120.

3. Tag space may be used to identify an internal point of origin of a transaction request. An example of this is the multiple prefetch buffers in FIG. 7.

4. Tag space may be used to identify a state at a point of origin that is internal or external to a chip. An example of this is whether a prefetch buffer has been invalidated, such as in FIG. 7.

5. Tag space may be used to identify an internal routing, for example, what portions of a chip a transaction was routed through.

6. Tag space may be used to identify a state or states of a chip, device, or other circuitry through which a transaction is routed.

7. Tag space may be used to identify a cause or causes of a transaction.

8. Tag space may be used to identify an attribute or attributes of an initiating event.

9. Tag space may be used to provide a snapshot of a register (e.g., performance register or error register) or part of a register.

These examples are not necessarily mutually exclusive and some could be special cases of others of the examples. The invention is not restricted to using all or even any of these examples.

Under the protocols of PCI-X and PCI Express, for a completion to be recognized by the requester, the tag provided in the address phase of the completion must be the same as that provided by the requester. Accordingly, if these protocols are used, the completer (or intermediate responding chip such as a hub) must not use a different tag field than is expected by the requester. However, the invention may be used in connection with other protocols that allow the completer to alter at least some of the tag space and still have the completion be valid. Further, the PCI-X or PCI Express protocols might be modified to allow this. In such a case, completer device 20 in FIG. 1 may set the state of at least some of the tag bits to communicate debug information. Completer device 30 and/or hub 42 in FIG. 2 may change the state of at least some of the tag bits. Chip 100 and/or chip 90 in FIG. 5 may change the state of at least some of the tag bits in the tag field as part of a completion or in response to a request to communicate information. For example, completer device 30 may set some bits to provide some information and hub 42 may then set the same or other bits to provide additional information. The tag bits set by a completer device or chip or an intermediate completing device or chip (such as a hub) may provide information about a variety of things (see, for example, the list of examples above).

As mentioned, in the completion attribute phase of PCI-X, bits AD[24]–AD[28] are reserved. Ordinarily, it is not a good idea to use reserved bits. However, in some situations, it may be possible to use the reserved bits to provide debug information.

Figure 8:
FIG. 8 is a block diagram representation of tag space bit setting circuitry according to some embodiments of the invention.

FIG. 8 illustrates tag space bit setting circuitry 180 which controls the setting of bits in the tag space to represent particular debug information. Tag space bit setting circuitry 180 may be in a device and/or in another part of a chip. For example, in FIG. 5, tag space bit setting circuitry 180 may be in devices 82, 92, and 102 and/or may be in bus transaction control circuitry 84, 94, 96, and 104, or in other parts of the chips.

An embodiment is an implementation or example of the invention. Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances "an embodiment," "one embodiment," or "some embodiments" are not necessarily all referring to the same embodiments.

If the specification states a chip, feature, structure, or characteristic "may", "might", or "could" be included, that particular chip, feature, structure, or characteristic is not required to be included. If the specification or claim refers to "a" or "an" element, that does not mean there is only one of the element. If the specification or claims refer to "an additional" element, that does not preclude there being more than one of the additional element.

The invention is not restricted to the particular details listed herein. Indeed, those skilled in the art having the benefit of this disclosure will appreciate that many other variations from the foregoing description and drawings may be made within the scope of the present invention. Accordingly, it is the following claims including any amendments thereto that define the scope of the invention.

What is claimed is:

1. A chip comprising:
   a device; and
   bus transaction control circuitry to provide bus transactions with tag space, wherein under some conditions at least part of the tag space is used to provide debug information and under some conditions at least part of the tag space is used to represent a transaction number, wherein the debug information identifies at least one of the following: a state or states at a point of origin, a state or states of a portion of the chip, and an attribute or attributes of an event in the chip.

2. The chip of claim 1, wherein the debug information identifies an external point of origin.

3. The chip of claim 1, wherein the debug information identifies an internal point of origin.

4. The chip of claim 1, wherein the debug information identifies an internal routing of at least one of the transactions.

5. The chip of claim 1, wherein the debug information identifies a cause or causes of at least one of the transactions.

6. The chip of claim 1, wherein the debug information provides a snapshot of at least part of a register in the chip.

7. The chip of claim 1, wherein at least some of the transactions are requests.

8. The chip of claim 1, wherein at least some of the transactions are completions.

9. The chip of claim 1, wherein the bus transaction control circuitry includes tag space bit setting circuitry to set at least some bits of the tag space to provide the debug information.

10. The chip of claim 1, further comprising tag space bit setting circuitry to set at least some bits of the tag space to provide the debug information and wherein the tag space bit setting circuitry is outside the bus transaction control circuitry.

11. The chip of claim 1, further comprising additional devices.

12. A system comprising:
a bus;
a first chip and a second chip each connected to the bus; wherein the first chip includes a first device to make requests through the bus of a second device in the second chip, wherein the requests are provided in bus transactions with tag space, wherein under some conditions at least part of the tag space is used to provide debug information and under some conditions at least part of the tag space is used to represent a transaction number; and
probes and debugging circuitry, wherein the probes are positioned to sense the debug information on the bus and provide a representation of the sensed debug information to the debugging circuitry.

13. The system of claim 12, wherein the debug information identifies an external point of origin.

14. The system of claim 12, wherein the debug information identifies an internal point of origin.

15. The system of claim 12, wherein the debug information identifies a state or states at a point of origin.

16. The system of claim 12, wherein the debug information identifies a cause or causes of at least one of the transactions.

17. The system of claim 12, wherein the debug information identifies an attribute or attributes of an event in the system.

18. The system of claim 12, wherein the tag space includes at least some phantom function numbers.

19. The system of claim 12, wherein the second chip at times returns different tag values than were provided to the second chip and wherein the different tag values include debug information.

20. The system of claim 12, wherein the second chip uses reserved bits to provide debug information to the bus.

21. The system of claim 12, wherein the first device includes tag space bit setting circuitry to set at least some bits of the tag space to provide the debug information.

22. The system of claim 12, wherein the first chip includes tag space bit setting circuitry to set at least some bits of the tag space to provide the debug information and wherein the tag space bit setting circuitry is outside the first device.

23. The system of claim 12, further comprising additional buses and chips.

24. A system comprising:
a first bus and a second bus;
a first chip connected to the first bus;
a second chip connected to the second bus; and
a third chip connected to the first and second buses;
wherein the first chip includes a first device to make requests of a second device in the second chip through the first bus, the third chip, and the second bus, wherein the requests are provided in bus transactions with tag space, wherein under some conditions at least part of the tag space is used to provide debug information and under some conditions at least part of the tag space is used to represent a transaction number,
wherein the debug information identifies at least one of the following: a state or states at a point of origin, a state or states of a portion of the chip, and an attribute or attributes of an event in the chip.

25. The system of claim 24, further comprising probes and debugging circuitry, wherein the probes are positioned to sense the debug information on the bus and provide a representation of the sensed debug information to the debugging circuitry.

26. The system of claim 24, wherein the third chip at times provides different tag values to the second chip than were provided to the third chip by the first chip and wherein the different tag values include debug information.

27. The system of claim 24, wherein the second chip at times returns different tag values than were provided to the second chip and wherein the different tag values include debug information.

28. The system of claim 24, wherein the second chip uses reserved bits to provide debug information to the bus.

29. The system of claim 24, wherein the third chip at times returns different tag values than were provided to the third chip and wherein the different tag values include debug information.

30. The system of claim 24, wherein the third chip uses reserved bits to provide debug information to the bus.

31. The system of claim 24, further comprising additional buses and chips.

32. A chip comprising:
a device; and
bus transaction control circuitry to provide bus transactions with reserved bits, wherein under some conditions at least some of the reserved bits are used to provide debug information, wherein the debug information identifies at least one of the following: an external point of origin, an internal point of origin, a state or states at a point of origin, and an internal routing of at least one of the transactions.

33. A chip comprising:

a device; and bus transaction control circuitry to provide bus transactions with tag space, wherein under some conditions at least part of the tag space is used to provide debug information and under some conditions at least part of the tag space is used to represent a transaction number, wherein the tag space includes at least some phantom function numbers.

* * * * *

UNITED STATES PATENT AND TRADEMARK OFFICE
CERTIFICATE OF CORRECTION

PATENT NO. : 7,043,667 B2  Page 1 of 1
APPLICATION NO. : 10/146002
DATED : May 9, 2006
INVENTOR(S) : Smith It is certified that error appears in the above-identified patent and that said Letters Patent is hereby corrected as shown below:

In column 5, at line 56, delete "t00" and insert --100--.

Signed and Sealed this

Twentieth Day of January, 2009

JON W. DUDAS
*Director of the United States Patent and Trademark Office*